June 1, 1926.
W. MEREDITH ET AL
FLOW NOZZLE
Filed April 16, 1924
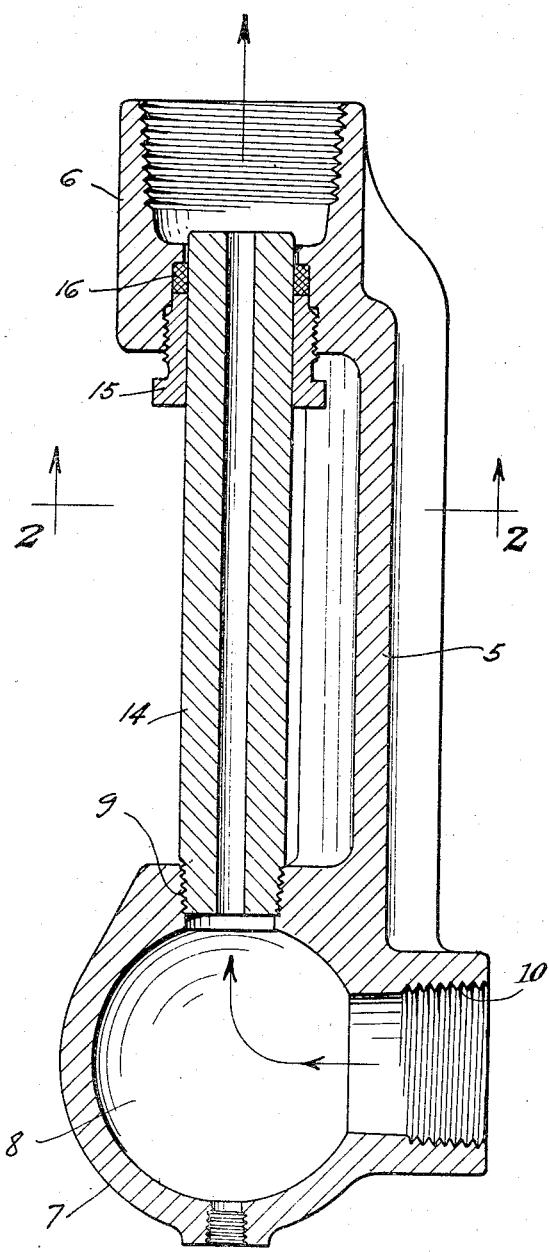
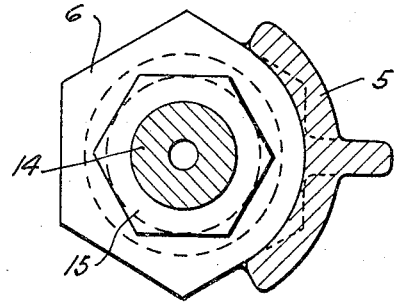
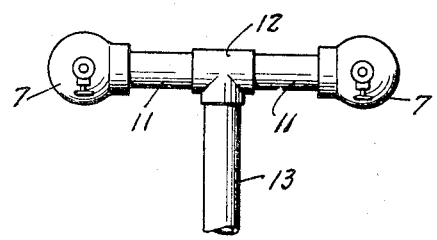
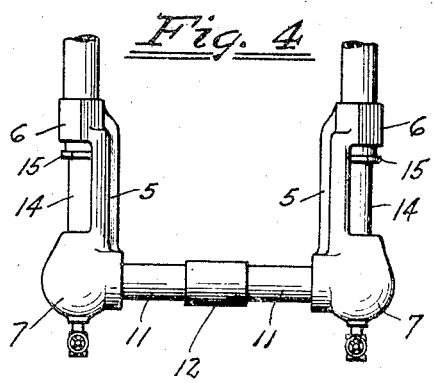
INVENTORS
Walter L. Foster
William Meredith
BY Westall and Wallace
ATTORNEYS Patented June 1, 1926.

1,586,825

UNITED STATES PATENT OFFICE.

WILLIAM MEREDITH, OF HUNTINGTON BEACH, AND WALTER L. FOSTER, OF WHITTIER, CALIFORNIA, ASSIGNORS OF ONE-THIRD TO STEPHEN A. D. COX, OF HUNTINGTON BEACH, CALIFORNIA.

FLOW NOZZLE.

Application filed April 16, 1924. Serial No. 706,989.

This invention relates to a device for introduction into a line through which a fluid flows under pressure, and wherein the flow is thereby restricted, and pertains more particularly to a replaceable tubular member having a relatively small bore.

The flow of crude petroleum from wells under pressure is commonly reduced by introduction into the discharge line of a flow nozzle consisting of a tubular nipple having a bore of relatively small diameter. The oil flowing from the well contains sand and like foreign matter which cuts the nipple enlarging its bore in a short time and soon making it unserviceable. It is then necessary to replace the nipple. This is done by shutting off the flow and removing and replacing the nipple. The primary object of this invention is to provide a flow nozzle so constructed that a nipple may be replaced with a minimum of labor and in a short time. In addition to the broader objects of this invention, there are certain details of structure, whereby a simple, durable, and economical structure is obtained.

These objects together with other objects and corresponding accomplishments are obtained by means of the embodiment of our invention illustrated in the accompanying drawing, in which:

Fig. 1 is an axial section through a complete flow nozzle; Fig. 2 is a section as seen on the line 2—2 of Fig. 1; Fig. 3 is an end elevation of a pair of nozzles so connected that either one or both may be used; and Fig. 4 is a plan view of the structure shown in Fig. 3.

Referring more particularly to the drawing, the nozzle comprises a bridge 5 with a coupling cap 6 at one end referred to as the slip end and an elbow cap 7 at the other end. As shown herein, the bridge bar is curved in transverse section and is provided with a longitudinally extending rib to reinforce the bridge. The cap 7 has a spherical chamber 8. The chamber has a bore 9 internally threaded to receive one end of a flow nipple. The cap has another internally threaded bore 10 at right angle to bore 9 for connecting to a pipe nipple 11. Nipples of the members of a pair of nozzles are joined by a T 12 hose other branch is connected by a pipe 13 to the casing head of the oil well.

On the inner side, the cap 6 has a bore internally threaded provided with an unthreaded portion of reduced diameter and a further reduced portion to form a shoulder. The flow nipple 14 is threaded at one end whereby it may be secured to the cap 7. The other end thereof is smooth so as to slip into cap 6. A gland nut 15 is mounted over the flow nipple and threadedly engaged with the cap 6. Its end is arranged to abut packing 16 of any suitable type, thereby forming a stuffing box.

It is obvious that when the flow nipple is in position it is securely packed and tight against leakage of oil. When by reason of wear or for any other cause, it becomes necessary to replace the nipple, the flow is shut off, and the nipple removed in the following manner: Gland nut 15 is backed up until it is disengaged from the cap 6. The nipple is then turned to disengage it from cap 7. The nipple is then slipped longitudinally into cap 6 so that the other end clears cap 7, and is tilted so that it may be withdrawn from cap 6. The new nipple is then slipped into cap 6 and screwed into cap 7, packing 16 being placed in position. Nut 15 which has been mounted on the nipple is next screwed firmly into cap 6 so as to expand packing 16 and make a leak tight fit.

It is obvious that a nipple may be quickly removed and replaced with a new one with a minimum of labor. The dual construction shown in Figs. 3 and 4 is used so that while one flow nipple is being replaced, the other nozzle may be used, one nozzle serving as a bypass for the other. Our structure does away with the necessity of employing housings, unions, T's, buil plugs, and like fittings. It also eliminates ground and tapered joints, thereby avoiding leakage.

What we claim is:

1. A flow nozzle comprising a bridge unit having spaced aligned nipple receiving openings fixedly positioned thereon at the ends so as to provide a laterally accessible space therebetween, a flow nipple of greater length than the space between said openings spanning the latter, said nipple being arranged to be detachably secured to one end of said unit in the opening therein by means of screw threads and to form a leak tight joint therewith, the other end of said nipple being mounted in the other opening of said unit so that it may be backed therein upon detachment of the other end from said unit, a joint closure member encircling said nipple and arranged to be secured to said unit in the last mentioned opening the latter providing clearance about said nipple whereby said nipple may be laterally inserted in and removed from said unit by longitudinally sliding, tilting, and moving laterally the nipple.

2. A flow nozzle comprising a unitary frame having spaced caps fixed in position thereon and having aligned nipple receiving openings, a nipple longer than the distance between said openings insertable through the side of said frame, means to detachably and tightly secure said nipple to one of said caps, the opening in the other cap being of such dimension and contour as to permit the other end of said nipple to be slipped therein so that it may be backed therein upon detachment of the other end from the cap and tilted, and a joint closure member detachably mounted in said cap about the slip end of said nipple, whereby said nipple may be detached from said first mentioned cap, moved longitudinally, tilted and removed laterally from said frame.

In witness that we claim the foregoing we have hereunto subscribed our names this 31st day of March, 1924.

WILLIAM MEREDITH.
WALTER L. FOSTER.